Figure 9:
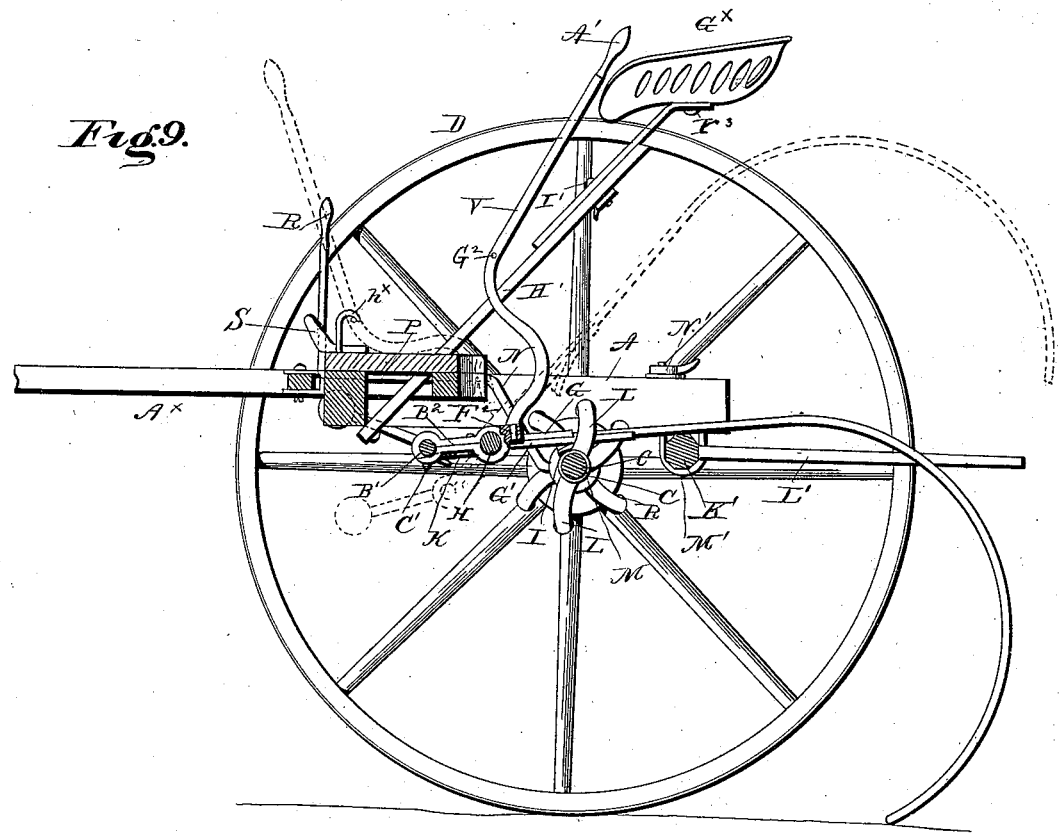

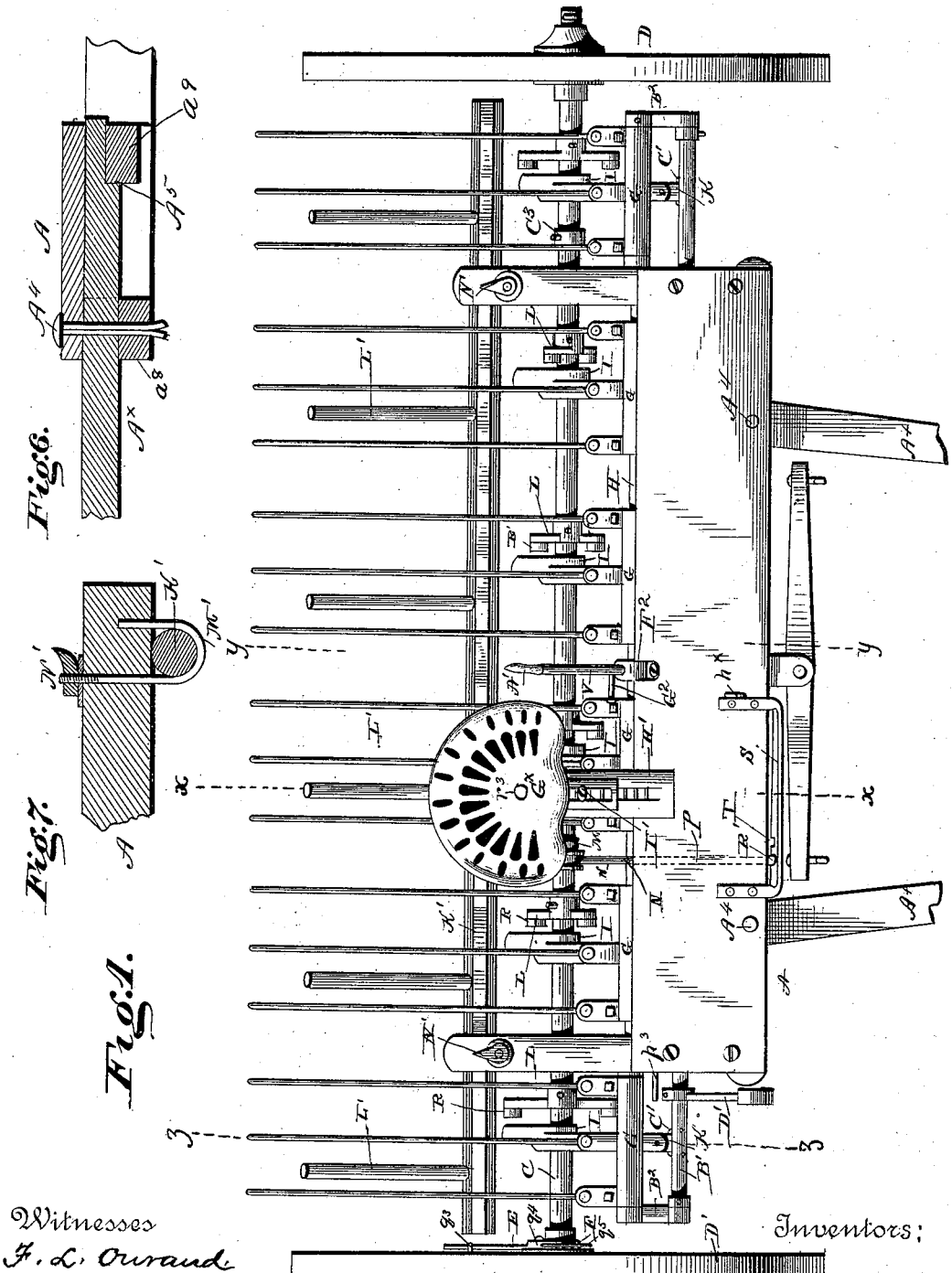

(No Model.) 3 Sheets—Sheet 2.
I. L. LANDIS, ALBERT ISKE & ANTHONY ISKE.
COMBINED HAY RAKE AND TEDDER.
No. 374,795. Patented Dec. 13, 1887.
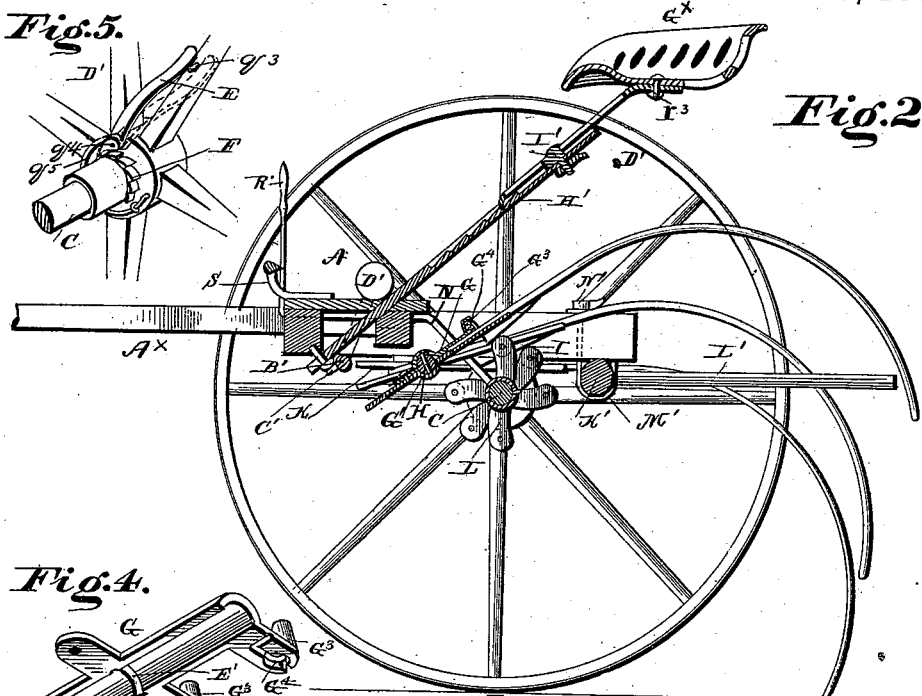
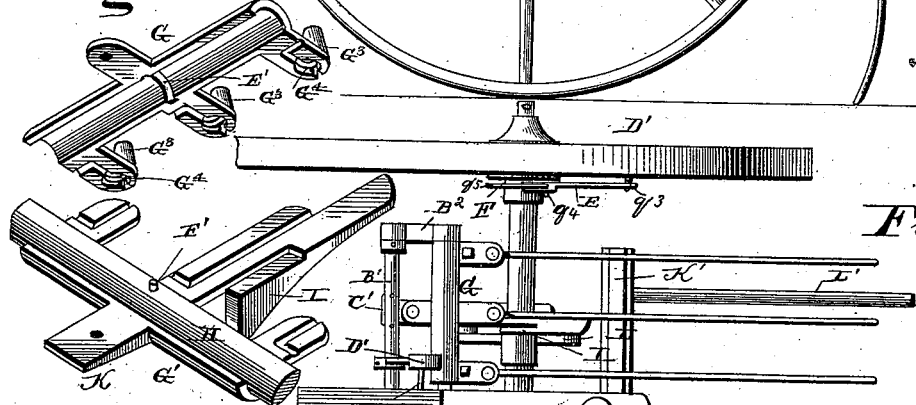
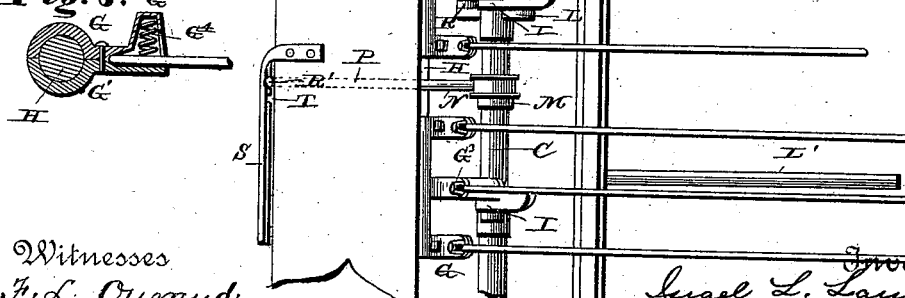
Witnesses
F. L. Ouraud
Chas. D. Davis
Inventors.
Israel L. Landis,
Albert Iske & Anthony Iske
By their Attorney
C. M. Alexander (No Model.) 3 Sheets—Sheet 3.

I. L. LANDIS, ALBERT ISKE & ANTHONY ISKE.
COMBINED HAY RAKE AND TEDDER.

No. 374,795. Patented Dec. 13, 1887.

Witnesses
John S. Finch Jr.
Chas. H. Davis

Inventors.
I. L. Landis, Albert Iske
Anthony Iske
By their Attorney
C. M. Alexander

UNITED STATES PATENT OFFICE.

ISRAEL L. LANDIS, ALBERT ISKE, AND ANTHONY ISKE, OF LANCASTER, PENNSYLVANIA; SAID ALBERT AND ANTHONY ISKE ASSIGNORS TO SAID LANDIS.

COMBINED HAY RAKE AND TEDDER.

SPECIFICATION forming part of Letters Patent No. 374,795, dated December 13, 1887.

Application filed February 26, 1887. Serial No. 228,917. (No model.)

*To all whom it may concern:*

Be it known that we, ISRAEL L. LANDIS, ALBERT ISKE, and ANTHONY ISKE, citizens of the United States, residing at Lancaster, in the county of Lancaster and State of Pennsylvania, have invented a certain new and useful Improvement in Combined Hay Rake and Tedder; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in that class of hay rakes and tedders which may be changed at will, as occasion requires, either to rake or ted the hay, as will be more fully hereinafter explained. In this class of machines as now constructed, in order to operate the tedding mechanism, cumbersome gearing has been employed, which renders the machine heavy and creates unnecessary draft on the animals, besides rendering accidents liable, requiring frequent costly repairs, generally at the time when the machine is most needed and when its services cannot well be dispensed with. Moreover, in the machines now in use having positive gearing the rake or tedding-forks have a tendency to dig into the ground in their downward motion and tear out young grass or plants and also to raise the earth in clods, which will be gathered up with the hay when raked into windrows. Again, the grass is liable to be thrown with the green portions underneath and the partially-dried portions on top, preventing the proper circulation of the air through the same, which prevents uniform drying, while the upper portions of the mass, which are exposed to the sun, are liable to become scorched, which impairs the flavor of the hay and deprives it to a great extent of its nutritive properties as fodder.

The object of our invention is to provide a combined tedder and rake whereby the teeth shall accomplish the tedding by gathering up the hay for a short distance while traveling over the ground, and then at intervals slowly and effectually turn it over, separating the bunches, so as to turn the dryest portions underneath and the greenest uppermost, permitting a free circulation of air through the same and providing for the proper sun-drying thereof.

A further object of our invention is to provide a light-running machine without cog-gearing, springs, and other unnecessary mechanism, and to arrange all the working parts so that they may be instantly operated and changed from rake to tedder or from tedder to rake by the driver without leaving the platform of the machine, as more fully hereinafter specified.

The above-mentioned objects we attain by the means illustrated in the accompanying drawings, in which—

Figure 10:
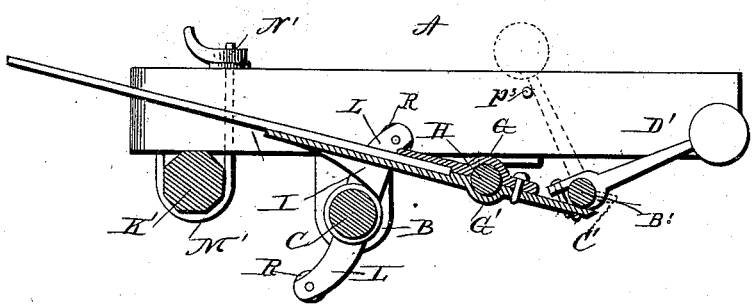

Figure 1 represents a top or plan view of our improved rake and tedder complete. Fig. 2 represents a sectional view taken on the line $x\ x$ of Fig. 1. Fig. 3 represents a partial top view of the machine when adjusted for use as a tedder; Fig. 4, detached detail views of the heads carrying the rake-teeth; Fig. 5, a detached view of the main shaft and driving-wheel, with the pawl-and-ratchet mechanism; Fig. 6, a detailed sectional view showing the means of securing the shafts to the carriage or truck; Fig. 7, a detailed sectional view of a portion of the machine, showing the means of adjustably securing the finger-bar shaft thereto; and Fig. 8, a detailed view of a modification of one of the heads, showing the spring for holding the teeth yieldingly down. Fig. 9 is a vertical section taken through the machine in the plane indicated by dotted line $y\ y$ on Fig. 1, indicating the rake and its hand-lever A' by the aid of full and dotted lines in two positions. Fig. 10 is a detail of certain parts adjusted for tedding, taken in the vertical plane indicated by dotted line $z\ z$ on Fig. 1.

The letter A indicates the frame or truck of the machine, which is provided with hangers B, (one of which is shown in Fig. 10,) through which passes and is journaled the axle or main shaft C, which is arranged to turn in said bearings, as well as to allow a slight longitudinal movement of the frame. The thills A$^\times$ are passed between the platform of the frame A, and the sills $a^8$ $a^9$, shouldered at $A^5$, (see Fig. 6,) and held in their places by means of split pins $A^4$, passed vertically through the platform and the rear portions of said thills and through the front sill, $a^8$. Upon the extremities of said axle are loosely mounted the wheels D D', the wheel D' being provided with a pawl-lever, E, which takes into a ratchet, F, on the shaft, so as to rotate the same when the machine is traveling forward, but allow the shaft to remain idle when backing to prevent unnecessary turning of the tedding-teeth.

The pawl-lever E is allowed to spring laterally, and it is fulcrumed on the inner side of the hub of the wheel D'. This lever has pivoted to it a pawl, $q^4$, adapted to engage with the ratchet F on the axle C, and held in engagement with this ratchet by a spring, $q^5$. When the machine is used as a rake, the lever E is moved back of a pin, $q^3$, fixed to one of the spokes of wheel D', thus disengaging the pawl from shaft C and allowing wheel D' to turn freely thereon. When the machine is used as a tedder, the said lever E is adjusted in front of the pin $q^3$ and pawl $q^4$ allowed to engage the wheel D with its shaft when the machine is moved forward.

The tedding or rake teeth are arranged in groups or sets of two or more in number, and are clamped between the heads G G'. These heads are constructed, preferably, of cast metal, and are semi-cylindrically recessed, so as to set over the shaft H of the machine and turn partially thereon independently of each other. The lower portions of the heads have rearward cam projections, I, and forwardly-projecting lips K, for the purpose hereinafter explained.

On the main shaft C of the machine are secured a series of arms, L, which are provided with anti-friction wheels R, two arms corresponding to each tedder-section, and the whole being arranged to either clear the cam-extensions on the heads when the machine is doing raking duty or engage them and operate the sections alternately when the machine is employed as a tedder. The shaft C is provided with an adjustable collar, $C^3$, by means of which the longitudinal movement of the frame may be limited, so as to bring the tappet arms into range with the respective cams. This operation is accomplished as follows: Upon the main shaft is a fixed collar, M, having an annular groove in its periphery, which is embraced by the rear end of a laterally-vibrating lever, N, fulcrumed to the truck or frame at P, and having a handle, R', by means of which it may be operated.

The letter S indicates a foot-rest or lock-frame provided with detents T, by which the lever is held in position as the machine may be used for a rake or tedder.

When the handle R' is adjusted to the right hand, as shown in Fig. 1, the wheels or tappets R are out of alignment with the cam projections I and do not touch them. The machine is thus used as a rake proper.

The letter V indicates a lever secured to the clip K on shaft H, which forms its fulcrum, the upper end of said lever being provided with a handle, A', in reach of the driver, so that he can operate it to raise the teeth without leaving the platform. The clip connects rigidly with a longitudinal bar, B', which is secured to the arms $B^2$, pivoted to the shaft H. The said bar at suitable intervals is provided with loops C', which are in range with the lips K, so as to engage the same and hold the rake teeth so as to move simultaneously, when desired. The bar at one end is provided with a weighted lever, D', under control of the driver, by which it may be operated to set and unset the rakes.

When the machine is used as a rake, the weighted arm or lever, which is rigidly secured to the bar B', is adjusted forward, as shown in Fig. 1, thus causing all of the loops C' to engage with the lips K and hold all the rake-teeth in alignment, so that they can all be raised and lowered together by manipulating the hand-lever A'; but when the machine is used as a tedder the said weighted lever is moved back against a pin-rest, $p^3$, thus allowing the several groups or sets of rake-teeth to rise and descend independently of each other.

The letter K' indicates a transverse bar which carries the clearing-arms L', which extend rearwardly between the rake-teeth. The said bar is journaled in bearings M', which are U-shaped in form, one arm being fixed to the rearwardly-extending beams of the main frame, and the other passing through the same loosely, the loose arm being screw-threaded and provided with a thumb-nut, N', by which the bearing may be tightened upon the bar K'. By this means the bar may be clamped so as to hold the clearing-fingers in any desired inclination.

The heads G before mentioned, are each provided with a segmental groove, E', on its under side, and into these grooves project pins F', set into the shaft H, as shown in Fig. 4, whereby the said heads, when clamped around the shaft, will be permitted to partially rotate thereon when the machine is being used, while at the same time any longitudinal movement of the heads on the shaft is prevented. By this arrangement of securing the heads to the shaft, it will be observed, the pin is effectually prevented from being lost by working loose from the shaft and falling out, and also that all dust and foreign substances are prevented from collecting in the groove.

The driver's seat $G^×$, which is pivoted at $r^3$, has a slotted shank, which is adjustably secured to an inclined standard, H', by means of a screw-bolt and nut, I', in order to adjust it to the convenience of the driver. The slotted shank of the seat at its upper end is bent at an angle rearwardly, and the seat is pivoted to such bent end at $r^3$, so that the driver may turn it in any direction, as occasion may require, and operate the machine either by foot or by hand, as may be convenient. The grooved standard has a rack with which intergears a projection on the slotted shank, serving to give the seat a firm support in whatever position it may be adjusted.

The tappet-arms on the main axle are provided with anti-friction rollers on one side, which work when the axle is turning to operate the parts of the machine as a tedder.

The operating hand-lever A', which is located in close relation to the driver's seat G$^x$, is curved, as shown in Fig. 9, and its lower end is fitted in a socket, F$^2$, in clips which embrace the shafts H B'. This lever is used for raising and depressing the rake-teeth, and when the rake-teeth are raised to the position indicated in Fig. 9 in dotted lines it can be held by a pivoted hook, $h^x$, engaging with a laterally-projecting pin, G$^2$, fixed to said lever.

As constructed, it will be obvious that the operative parts of the machine are all under direct control of the driver without unhitching the draft-animals.

By means of the pawl-lever E and ratchet-wheel F the machine can be driven forward without rotation of the parts, so that there will be no tendency to take up hay or grass and wrap the same on the shafts, and thus cause clogging, and by constructing the heads in separate parts provision is made for removing the heads and the rake-teeth in case either should become broken or otherwise injured, without taking apart the machine, which obviously would waste valuable time. The annular grooves in the head, it will be observed, prevent the confining-pin from working out and being lost.

The upper head of each rake or tedder section is provided with a recessed stud, G$^3$, slotted in the rear. The rake-teeth are pivoted between the two parts of the heads and extend backward through the slots, having an upward and downward movement therein. In the upper portion of the recess is located a spring, G$^4$, to keep the rake-teeth yieldingly down to their work.

When the hand-lever V is moved forward in the act of raking the hay in windrows, it is held forward with the tines raised in the position indicated by dotted lines, Fig. 9, by the hook $h^x$. The shaft B', which bears the loop engagements for the front ends, K, of the rake-bearers, is adapted to oscillate as described in its bearings, and is held at the two different points of its oscillation by the weighted arm D' bearing downwardly against pin $p^3$ when the said engagement is effected and upwardly against the pin $p^3$ when the device is adjusted for a tedder alone. When the loaded arm or bar B' is moved forward, as shown in Figs. 1 and 9, the loops C' are caused to engage with the front ends or extensions, K, of heads G', so that when lever V is thrown forward the rake-teeth will be raised free from the ground. When the arm D' is moved backward against the pin $p^3$, the loops C' will be disengaged from said extensions, thus allowing the rake-teeth to be vibrated by the tappets on the axle C.

Having thus fully described our invention, what we claim, and desire to secure by Letters Patent, is—

1. The combination, in a hay rake and tedder, of the truck or carriage, the transverse axle upon which the frame is mounted, and the loosely-mounted wheels, one having a spring-arm provided with a spring-actuated pawl engaging with a ratchet on the axle and a pin, $q^3$, on a spoke of the wheel D', whereby the machine may be caused to move the teeth or permit them to remain idle, substantially as specified.

2. The combination, with the rake-teeth shaft having independently-mounted sections thereon provided with forwardly-projecting lips, of the oscillating bar extending along the front of the same, and provided with loops to engage the lips and hold the tedder or rake sections so as to move together, substantially as specified.

3. The combination, in a combined hay rake and tedder, of a truck or frame mounted by hangers on the axle of the transporting-wheels and laterally movable thereon by a vibrating hand-lever, rake-teeth secured to independent sleeves on a transverse shaft, said sleeves provided with front projections, arms or tappets on the said axle adapted to strike rear extensions of the said sleeves, and a rocking rod or shaft provided with a weighted lever and with loops adapted to engage with said front projections of the said sleeves, all substantially as and for the purposes described.

4. A combined horse hay rake and tedder consisting of a main frame mounted by its rear extensions and hangers upon the axle of two transporting wheels, and laterally adjustable thereon by means described, tappets provided with anti-friction rollers and secured on said axle, parallel shafts having their bearings in the main frame, the rear shaft provided with oscillating rake-heads formed with front and rear extensions, the front shaft provided with a weighted lever and with loops adapted to engage the front extensions of the rake-heads and to vibrate with the rear shaft, rake-teeth secured to the rear extensions of said rake-heads, and a clearer adjustable by clamping devices, substantially as described.

5. In a hay rake and tedder, the loosely-journaled oscillating bar provided with suitable loops, and the weighted lever attached thereto, in combination with the lipped heads carrying the rake or tedder teeth, substantially as specified.

6. In a combined hay rake and tedder, the combination of the axle and its supporting-wheels, the frame supported and adjustable on the said axle by means substantially as described, the tappets upon the said axle, the rake-head shaft and its rake-head sections, the latter being provided with forwardly-extending arms K, and the oscillating bar B', provided with loops C', to engage the arms K, substantially as herein described.

7. In a combined hay rake and tedder, the combination, with the supporting-wheels and their axle, the tappet-arms upon the axle, the grooved collar M, secured upon the axle, and the stop-collar C³, also secured on the axle, of the frame mounted upon the axle and restricted in its longitudinal movement thereon by the said collar C³, the rocking lever N, journaled in the frame and engaging with the said collar M on the axle to adjust the frame back and forth upon the same, the rake-shaft journaled in the frame, the sectional rake-heads provided with rake-teeth, mounted on said rake-shaft and movable with the said frame, and means, substantially as described, for locking the said rake-heads, substantially as described.

8. The combination, with the oscillating bar or shaft B', provided with engaging-loops, of the rake-shaft H, the rake-head sections, each composed of the sections G G', secured together and loosely embracing the shaft H, and adapted to clamp and hold the rake-teeth, one of the sections of each rake-head section being provided with an extension, K, and the axle provided with tappets, substantially as described.

9. The combination, with the shaft H, having secured in it the pin F', of the clamping-heads G G', longitudinally grooved on their inner faces and adapted to embrace the said shaft and clamp and hold the rake-teeth, the upper head, G, being provided on its under grooved side with a segmental groove, E', into which the pin F' on the shaft projects, whereby the clamping-heads are allowed a partial rotation and are at the same time prevented from a lateral movement upon the shaft, substantially as described.

In testimony whereof we affix our signatures in presence of two witnesses.

ISRAEL L. LANDIS.
ALBERT ISKE.
ANTHONY ISKE.

Witnesses:
  P. DONNELLY,
  F. A. DIEHL.